United States Patent
Park et al.

(10) Patent No.: US 9,180,525 B2
(45) Date of Patent: Nov. 10, 2015

(54) TOOL HOLDER USING SHAPE MEMORY ALLOY AND TOOL HOLDING METHOD

(75) Inventors: Jong Kweon Park, Daejeon (KR); Woo Cheol Shin, Daejeon (KR); Seung Kook Ro, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 0 days.

(21) Appl. No.: 13/509,135

(22) PCT Filed: Dec. 3, 2010

(86) PCT No.: PCT/KR2010/008768
§ 371 (c)(1),
(2), (4) Date: May 10, 2012

(87) PCT Pub. No.: WO2011/071315
PCT Pub. Date: Jun. 16, 2011

(65) Prior Publication Data
US 2012/0237309 A1    Sep. 20, 2012

(30) Foreign Application Priority Data
Dec. 8, 2009    (KR) .......................... 10-2009-0121415

(51) Int. Cl.
*B23P 19/04*    (2006.01)
*B23P 11/02*    (2006.01)
(Continued)

(52) U.S. Cl.
CPC ............... *B23B 31/02* (2013.01); *B23B 31/117* (2013.01); *B23P 11/027* (2013.01); *B23B 2228/16* (2013.01); *Y10T 408/953* (2015.01)

(58) Field of Classification Search
CPC .. B23B 31/02; B23B 31/117; B23B 2228/16; B23P 11/027; Y10T 408/953

USPC ................... 29/243, 446, 447, 450; 269/266; 279/43.1, 46.1, 46.2, 102, 103; 403/28
See application file for complete search history.

(56) References Cited

U.S. PATENT DOCUMENTS 4,561,415 A * 12/1985 Willot ........................ 125/11.04
4,721,423 A *  1/1988 Kubo ............................ 409/234
(Continued)

FOREIGN PATENT DOCUMENTS

EP    0004696    10/1979
JP    62-199306    9/1987
(Continued)

OTHER PUBLICATIONS

Machine Translation of JP 09-108973A, Hashidate, published Apr. 1997.*
(Continued)

*Primary Examiner* — Essama Omgba
*Assistant Examiner* — Darrell C Ford
(74) *Attorney, Agent, or Firm* — Lex IP Meister, PLLC

(57) ABSTRACT

A tool holder holding a tool according to the present invention includes: a tool mounting unit forming and penetrating a tool fixing hole having an interior diameter that is relatively smaller than an exterior diameter of a shank unit of the tool; and at least one shape memory alloy ring inserted and arranged to a ring fixing hole formed at the tool mounting unit to have an interior diameter that is relatively larger than the tool fixing hole, wherein an interior diameter size of the tool fixing hole is forcibly changed by deformation of a shape memory alloy ring by a heating source and a cooling source provided to the shape memory alloy ring for clamping or unclamping the tool.

5 Claims, 4 Drawing Sheets

(51) Int. Cl.
*B23Q 3/12* (2006.01)
*B23B 31/10* (2006.01)
*B23B 31/117* (2006.01)
*B23B 31/02* (2006.01)

(56) References Cited

U.S. PATENT DOCUMENTS

| | | | | |
|---|---|---|---|---|
| 5,249,895 | A * | 10/1993 | Blaser | 408/156 |
| 5,265,456 | A * | 11/1993 | Kennedy et al. | 72/342.7 |
| 5,277,435 | A | 1/1994 | Kramer | |
| 6,077,003 | A * | 6/2000 | Laube | 409/234 |
| 6,511,077 | B1 * | 1/2003 | Voss et al. | 279/102 |
| 6,637,995 | B1 | 10/2003 | White | |
| 7,186,064 | B1 * | 3/2007 | Erickson et al. | 409/234 |
| 7,548,010 | B2 | 6/2009 | Browne et al. | |
| 8,439,369 | B2 * | 5/2013 | Haimer | 279/102 |
| 8,579,535 | B2 * | 11/2013 | Crane et al. | 403/28 |
| 8,656,573 | B2 * | 2/2014 | Freyermuth et al. | 29/447 |
| 8,821,085 | B2 * | 9/2014 | Haimer et al. | 409/234 |
| 2005/0238451 | A1 * | 10/2005 | Hartman | 409/234 |
| 2006/0019510 | A1 * | 1/2006 | Rudduck et al. | 439/74 |
| 2008/0260483 | A1 * | 10/2008 | Cook | 409/141 |
| 2009/0311061 | A1 * | 12/2009 | Santamarina et al. | 408/239 A |
| 2013/0220086 | A1 * | 8/2013 | Peters et al. | 81/451 |
| 2013/0309035 | A1 * | 11/2013 | Guy | 409/234 |
| 2013/0328276 | A1 * | 12/2013 | Moss et al. | 279/102 |
| 2014/0210169 | A1 * | 7/2014 | Mizoguchi | 279/102 |

FOREIGN PATENT DOCUMENTS

| | | |
|---|---|---|
| JP | 03-110028 | 5/1991 |
| JP | 09-108973 A * | 4/1997 |
| JP | 2004-142072 | 5/2004 |
| JP | 2005-074603 | 3/2005 |
| JP | 2006-346781 | 12/2006 |
| KR | 10-0411709 | 12/2003 |
| KR | 10-0784801 | 12/2007 |

OTHER PUBLICATIONS

Machine Translation—JP 09-108973.*
Korean Intellectual Property Office, International Search Report of PCT/KR2010/008768, Aug. 17, 2011.

* cited by examiner (a)

(b)

(c)

(d)

TOOL HOLDER USING SHAPE MEMORY ALLOY AND TOOL HOLDING METHOD

TECHNICAL FIELD

The present invention relates to a holder for holding a tool by using a shape memory alloy (SMA) and a method of holding a tool, and more particularly, to a tool holder using the shape memory alloy to reduce a number of elements of an entire device by using a shape memory alloy to realize a smaller size through a compact structure, to improve a rotation error motion under high rotational speed by minimizing a rotation imbalance factor through an axis symmetrical structure of a rotation axis, and to reduce a replacement time of unclamping and clamping of the tool, and a tool holding method thereof.

BACKGROUND ART

In general, a tool holder has a function of holding by clamping a tool such as a drill for mechanically processing a process object in a spindle unit of a machine tool.

In this conventional tool holder, as shown in FIG. 1 (a), as a taper collet-chuck method, a tool (T) is inserted to a taper collet 10 and a force is applied in an axial direction by a collet nut 12 to provide a component of force in a radial direction at a taper surface to clamp the inserted tool. As shown in FIG. 1 (b) and FIG. 1 (c), as a hydraulic-chuck method, a hydraulic chamber is formed inside a tool holder to elastically change an inner surface of a tool insertion inlet through a hydraulic force and to clamp the inserted tool, while as shown in FIG. 1 (d), as a shrink-fit method, high temperature heat is applied to heat-expand a tool mounting unit such that the tool is clamped by stress generated by interference of the tool mounting unit that is restored to an original shape at room temperature and a tool shank unit.

However, the conventional art has the following problems.

That is, the tool holder applied with the taper collet-chuck must be installed with a separate device for applying the force in the axial direction such as a spring or the collet nut as the taper collet to the spindle unit such that the entire structure of the tool holder is complicated such that an accurate process and assembly technique are required, and a shape error of the taper collet is accumulated, and as a result, a problem that a geometrical tool set-up error is increased is caused.

Also, deformation by centrifugal force decreases a taper contact ratio under high rotational speed of the tool holder and the tool position error of the axial direction may not only be generated, but also the structure of the spindle unit is further complicated because of adding a draw bar and a press control device in the axial direction inside the spindle unit to realize an auto tool exchange device such that a vibration mode characteristic of the spindle unit may be damaged.

Secondly, in the tool holder applied with the hydraulic-chuck method, when clamping the tool by using the high pressure, as shown in FIG. 1 (b), the separate pressing system is required such that the entire system is complicated and an auxiliary cost is added.

Also, in the case using the low pressure, as shown in FIG. 1 (c), a pressure bolt 14 is rotated at one side of the tool holder to increase the pressure, and in this case, it is difficult to realize the auto tool exchange device, and the position of the pressure volt and the arrangement of the hydraulic line inside the holder do not form axis symmetry such that a structural mass imbalance factor is generated, and as a result, the rotation accuracy of the high rotational speed is decreased.

Thirdly, the tool holder applied with the shrink-fit method applies the high temperature heat to exchange the tool such that the tool holder is moved to an additional heating system for the tool exchange after the tool holder is separated from the spindle unit, and thereby the entire system is complicated and the auxiliary cost is increased.

Also, for the unclamping of the tool, when heating to the high temperature, 1-2 minutes are taken if necessary such that the time for the tool exchange is increased, and as a result, work productivity is deteriorated.

DISCLOSURE

Technical Problem

The present invention provides a tool holder to reduce a number of elements of an entire device by using a shape memory alloy (SMA) to realize a smaller size through a compact structure, to improve a rotation error motion under high rotational speed by minimizing a rotation imbalance factor through an axis symmetrical structure of a rotation axis, and to reduce a replacement time of unclamping and clamping of the tool, and a tool holding method thereof.

Technical Solution

A tool holder using a shape memory alloy and fixing a tool according to an embodiment of the present invention includes: a tool mounting unit forming and penetrating a tool fixing hole having an interior diameter that is relatively smaller than an exterior diameter of a shank unit of the tool; and at least one shape memory alloy ring inserted and arranged to a ring fixing hole formed at the tool mounting unit to have an interior diameter that is relatively larger than the tool fixing hole, wherein an interior diameter of the tool fixing hole is forcibly changed by deformation of the shape memory alloy ring by a heating source and a cooling source provided to the shape memory alloy ring for clamping or unclamping the tool.

The tool fixing hole has an interior diameter of a size that is smaller than an exterior diameter of the shank unit of the tool, and a ring fixing hole having an interior diameter of a size that is larger than an interior diameter of the tool fixing hole is provided with a concentric circle along with the tool fixing hole.

The tool mounting unit has at least one slit hole connected to an inner hole of the tool mounting unit at an outer surface of a body.

The shape memory alloy ring is provided at both sides of the tool fixing hole. The shape memory alloy ring is coupled through interference of a predetermined size between the interior diameter of the ring fixing hole of the tool mounting unit and the exterior diameter of the shape memory alloy ring when the shape memory alloy ring is cooled to less than a martensite transformation temperature, the interior diameter of the tool fixing hole is restored to an original size for the tool to be clamped when the shape memory alloy ring is heated to more than an austenite transformation temperature, and the interior diameter of the tool fixing hole is expanded and deformed by a shape restoring operation for the tool to be unclamped.

A martensite transformation finish temperature point of the shape memory alloy ring is more than an ambient temperature of a processing room, and an austenite transformation start temperature point has a temperature characteristic of a degree near a lower limit among a high temperature region that the tool holder cannot reach during processing.

The shape memory alloy ring may be heated by a small heater as a heating device for an unclamping operation of the tool, and a cooling device for a clamping operation of the tool is formed through natural cooling by heat transmission with a surrounding environment inside the processing room, but the cooling device may be an air cooler or a cooling spray for quickly converting to the clamping operation if necessary.

A tool holding method using a shape memory alloy according to another embodiment of the present invention includes: forming a tool fixing hole to a tool mounting unit to have an interior diameter that is relatively smaller than an exterior diameter of a shank unit of the tool; inserting and arranging at least one shape memory alloy ring to the ring fixing hole formed at the tool mounting unit to have an interior diameter that is relatively larger than the tool fixing hole; and forcibly varying the interior diameter size of the tool fixing hole by deformation of the shape memory alloy ring that is generated when providing a heating source or a cooling source to the shape memory alloy ring for clamping or unclamping the tool.

An interference of a predetermined magnitude is applied between the interior diameter of the ring fixing hole of the tool mounting unit and the exterior diameter of the shape memory alloy ring to combine the shape memory alloy ring to the tool mounting unit when the shape memory alloy ring is cooled to less than a martensite transformation temperature, the interior diameter of the tool fixing hole is restored to the original size for the clamping of the tool when the shape memory alloy ring is heated to more than an austenite transformation temperature, and the interior diameter of the tool fixing hole is expanded by a shape restoring operation for the unclamping of the tool.

A martensite transformation finish temperature point of the shape memory alloy ring is more than an ambient temperature of a processing room, and an austenite transformation start temperature point has a temperature characteristic of a degree that is near a lower limit among a high temperature region that the tool holder cannot reach during processing.

Advantageous Effects

According to the present invention, the interior diameter size of the tool fixing hole is forcibly expanded or restored by the variation of the shape memory alloy ring inserted to the ring fixing hole of the tool mounting unit for unclamping or clamping the tool such that a number of an entire constitution element of the tool holder is reduced thereby reducing an accumulation error, and a rotation imbalance factor may be minimized through the axis symmetry structure thereby realizing a high precision operation.

Also, the exterior size of the tool holder is reduced compared with a conventional such that the tool holder is suitable to the small spindle unit and a space that does not interference to an object under the processing is surely advantage, the clamping and unclamping operation of the tool is possible through the control of the temperature difference of about 30-40 degree in the room temperature such that the tool exchange may be easily and fast performed, and the small heating device may be applied to the exchange of the tool such that the economic load is not large compared with the conventional shrink-fit method requiring the heating device of the high cost.

Figure 1:
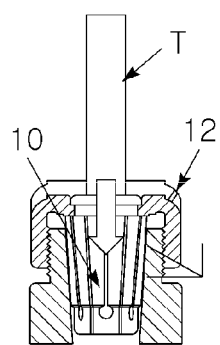
FIGS. 1 (a), (b), (c), and (d) are schematic diagrams of tool holders according to a conventional art.
Figure 1:
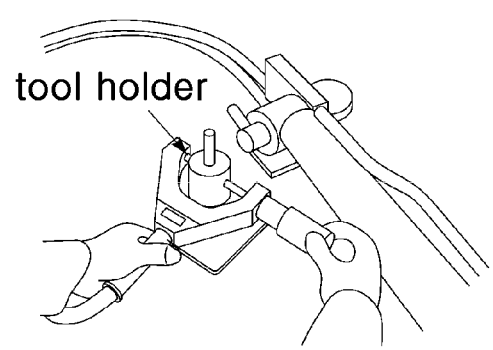
Figure 1:
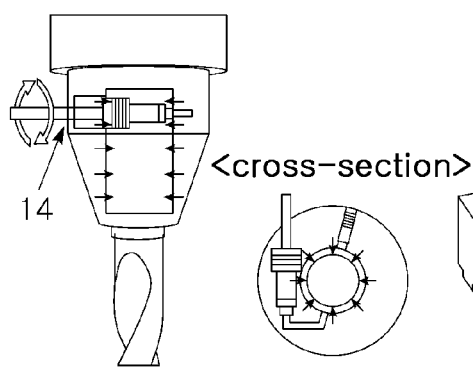
Figure 1:
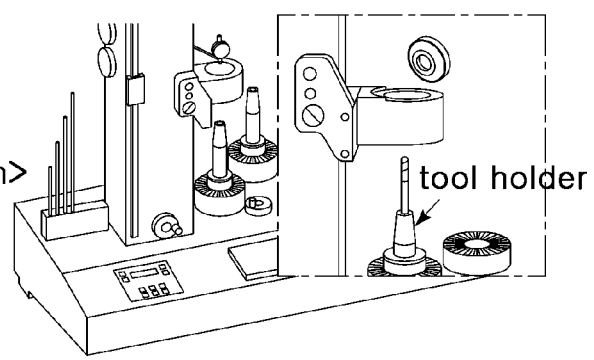

| * Description of Reference Numerals Indicating Primary Elements in the Drawings * | |
| --- | --- |
| 110: tool mounting unit | 112: tool fixing hole |
| 114: ring fixing hole | 116: slit hole |
| 120: shape memory alloy ring | T: tool |

MODE FOR INVENTION

Hereafter, an exemplary embodiment of the present invention will be described in detail with reference to accompanying drawings.

Figure 2:
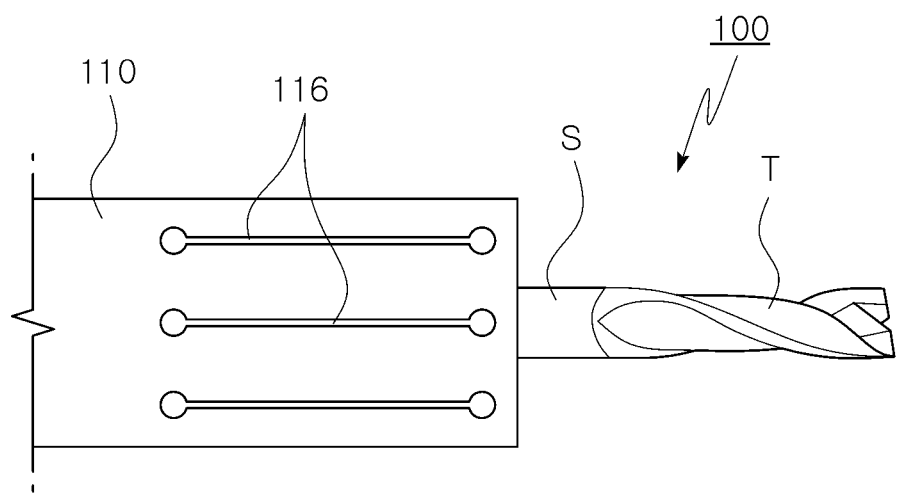
FIG. 2 is a top plan view of a tool holder using a shape memory alloy according to an exemplary embodiment of the present invention.
Figure 3:
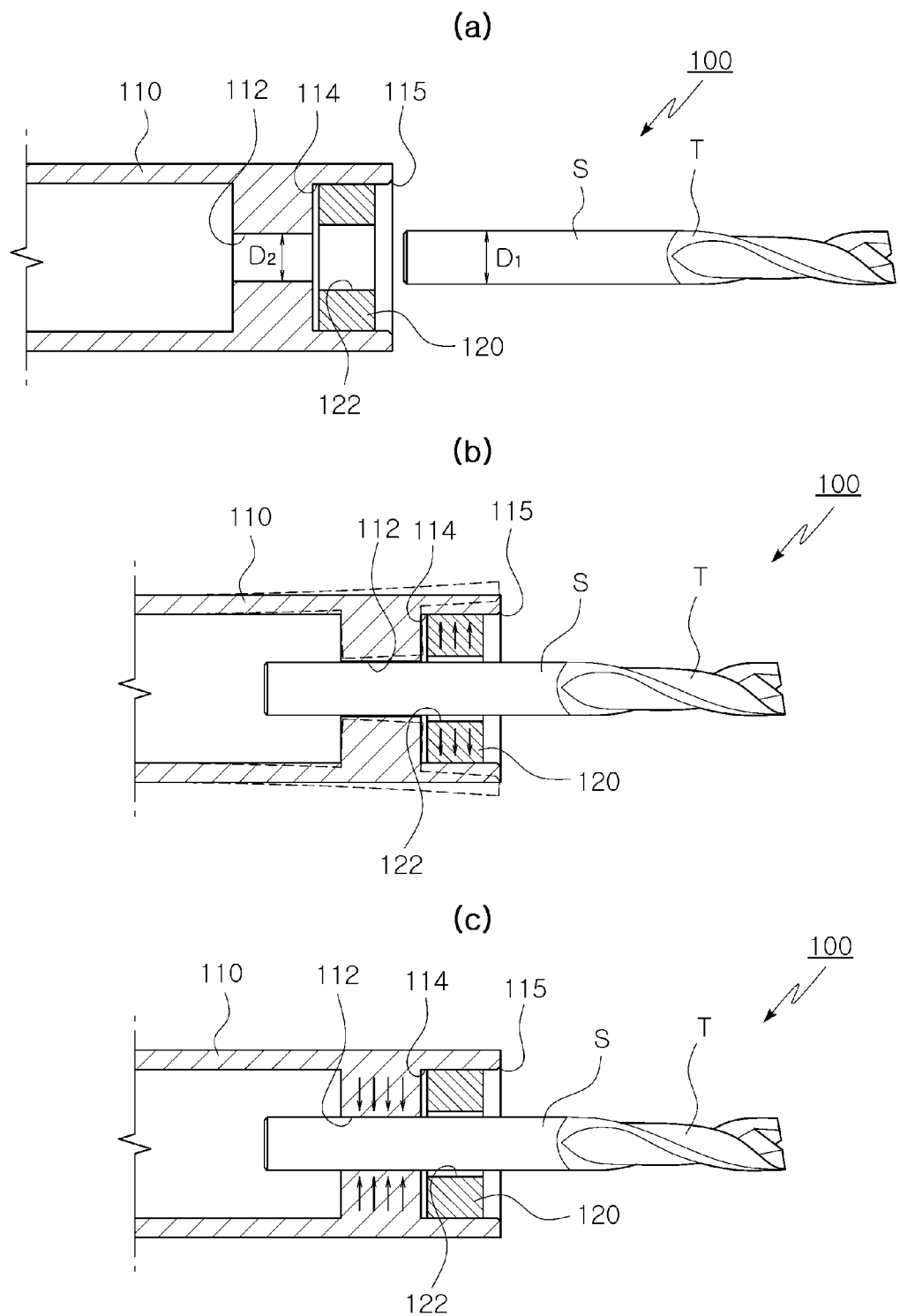
FIGS. 3 (a), (b), and (c) are longitudinal cross-sectional views of a state of fixing a tool by using a tool holder using a shape memory alloy according to an exemplary embodiment of the present invention.

FIG. 2 is a top plan view of a tool holder using a shape memory alloy according to an exemplary embodiment of the present invention, and FIGS. 3 (a), (b), and (c) are longitudinal cross-sectional views of a state of fixing a tool by using a tool holder using a shape memory alloy according to an exemplary embodiment of the present invention.

As shown in FIG. 2 and FIGS. 3 (a), (b), and (c), a tool holder 100 according to an exemplary embodiment of the present invention includes a tool mounting unit 110 and a shape memory alloy ring 120 made of a shape memory alloy material such that the tool mounting unit 110 is elastically varied according to a state change of the shape memory alloy ring 120 for clamping or unclamping a tool (T).

The tool mounting unit 110 is integrally connected to a spindle unit that is rotatably driven by a driving source of a mechanical process device that is not illustrated or is separately assembled, and a shank unit (S) of the tool (T) as an object to be fixed is inserted and clamped in a tool fixing hole 112 that is made of a metal elastic material such as carbon steel.

The tool fixing hole 112 is formed to be penetrated while having an interior diameter (ID) of a size that is smaller than an exterior diameter (OD) of the shank unit (S) of the tool (T), the tool fixing hole 112 is formed to be penetrated at an inner surface of a ring fixing hole 114 where the shape memory alloy ring 120 is inserted and arranged, and the ring fixing hole 114 having an interior diameter that is relatively larger than the interior diameter of the tool fixing hole 112 must be provided with a concentric circular shape along with the tool fixing hole 112.

Also, at least one slit hole 116 connected to the inner hole 114 is formed at the outer surface of the body of the tool mounting unit 110 so as to further easily form elastic variation of the radius direction.

Slit holes 116 may be formed with an interval of 120 degree so as to minimize variation generation by a mass imbalance under high rotational speed of the spindle unit and variation by centrifugal force, however it is not limited thereto and may be provided at various angles according to design conditions.

The shape memory alloy ring 120 is inserted and arranged in a forcibly fitted manner such that the external circumferential surface thereof closely contacts the interior circumference of the ring fixing hole 114 formed at the tool mounting unit 110 to be phase-changed according to an external condition, thereby functioning as a force generation source providing an exterior force that elastically varies the tool mounting unit. Also, the shape memory alloy ring 120 is forcibly fitted and assembled to the ring fixing hole 114 of the tool mounting unit 110 to not be separated from the tool mounting unit and an insertion position is firmly maintained inside the ring fixing hole.

In a center region of the shape memory alloy ring 120, a center hole 122 having an interior diameter that is relatively larger than the exterior diameter of the shank unit (S) to prevent interference along with tool during clamping and unclamping of the tool (T).

Figure 4:
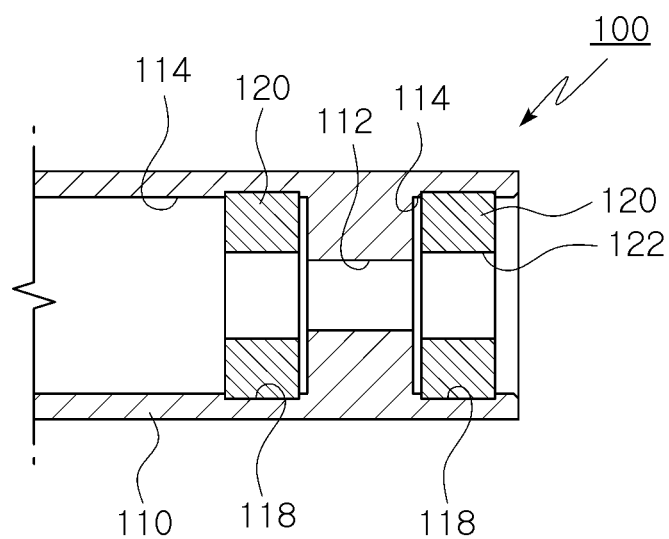
FIG. 4 is a longitudinal cross-sectional view of a tool holder using a shape memory alloy according to another exemplary embodiment of the present invention.

Here, the shape memory alloy ring 120 is disposed independently at one side of the tool fixing hole 112, however it is not limited thereto, and as shown in FIG. 4, it may be provided at both sides of the tool fixing hole 112.

Also, the tool mounting unit 110 preferably has a deviation preventing groove 118 into which the shape memory alloy ring 120 is inserted and hooked at the inner surface of the ring fixing hole 114 to not allow an exterior deviation by an external impact of the shape memory alloy ring 120 assembled to the tool mounting unit.

That is, the assembling method between the shape memory alloy ring 120 and the tool mounting unit 110 is realized by forcibly inserting the shape memory alloy 120 with the exterior diameter size that is larger than the interior diameter of the ring fixing hole from an inlet of the ring fixing hole 114 to an inside thereof by an external force of a predetermined intensity.

At this time, a tapered surface 115 of which the interior diameter is gradually increased closer to the outside is provided at the front end of the ring fixing hole 114 such that work of inserting the shape memory alloy ring 120 may be easily performed.

Particularly, the shape memory alloy of martensite has a low elastic force and plastic deformation is easily generated such that the shape memory alloy ring 120 may be easily assembled to a ring inner hole in the forcibly fitting manner.

Meanwhile, the shape memory alloy ring 120 is made of a shape memory alloy metal material that is restored to a shape of before deformation when reaching a predetermined temperature, and the special metal has a characteristic that an original shape is restored at a high temperature of austenite after the deformation in a low temperature. This characteristic is referred to as a shape memory effect (SME), and the shape memory effect is generated by martensite transformation according to temperature.

The shape memory alloy ring 120 is an alloy of Ni and Ti, a finishing temperature of the martensite transformation is 50° C., and a starting temperature of the austenite transformation is 100° C., and thereby the shape memory alloy ring 120 is restored to the original shape at more than the finishing temperature of the austenite transformation and has an elastic coefficient of 82 GPa.

Accordingly, by generating the exterior diameter deformation of the shape memory alloy ring 120 by a heating source and a cooling source that are directly or indirectly provided to the shape memory alloy ring 120 mounted to the ring fixing hole 114 of the tool mounting unit 110, the interior diameter of the tool fixing hole inserted with the tool is varied for the tool to be mechanical-processed for clamping or for tool exchange and mounting to be possible for unclamping.

In the work of clamping the tool by using the shape memory effect of the shape memory alloy ring 120, as shown in FIG. 3 (a), the shape memory alloy ring 120 mounted to the ring fixing hole 114 of the tool mounting unit 110 becomes martensite at room temperature and is compressed such that the interior diameter (ID) of the tool fixing hole 112 is smaller than the exterior diameter (OD) of the tool shank unit (S) and the shank unit of the tool (T) is arranged outside the tool mounting unit for the mounting preparation state.

In this state, heat is directly or indirectly provided to the shape memory alloy ring 120 by a heating device providing heat of a higher temperature than room temperature such that if the shape memory alloy ring 120 is heated to more than the austenite transformation temperature to be converted to the high temperature state, as shown in FIG. 3 (b), the exterior diameter of the shape memory alloy ring 120 is deformed to be expanded circularly, and thereby the tool mounting unit 110 is elastically deformed in a radial direction by the restoring force of the shape memory alloy ring 120 as shown by a dotted line and the interior diameter of the tool fixing hole 112 is expanded and deformed in the radial direction along with the ring fixing hole 114.

At this time, the tool mounting unit 110 has an elastic restoring force while the shape restoring by the contact with the restored shape memory alloy ring 120 is restricted.

Continuously, the shank unit (S) of the tool (T) is inserted and arranged in the tool fixing hole 112 having the expanded and deformed interior diameter to have a size that is larger than the exterior diameter of the shank unit (S) of the tool (T).

In this state, by directly or indirectly providing a cooling source to the shape memory alloy ring 120 by a cooling device providing the cooling source having a process room temperature, if the shape memory alloy ring 120 is cooled to less than the martensite transformation temperature and to the room temperature state, as shown in FIG. 3 (c), the elastic force of the shape memory alloy ring 120 is reduced and is contracted and deformed by the elastic restoring force of the tool mounting unit 110 such that the restoring force of the shape memory alloy ring 120 applied to the tool mounting unit is naturally released, and thereby the interior diameter of the tool fixing hole 112 is restored and deformed in the radius direction along with the ring fixing hole 114 of the tool mounting unit 110.

Accordingly, the interior diameter of the tool fixing hole 112 is restored and deformed to have the size that is smaller than the exterior diameter of the shank unit of the tool such that the inner surface of the tool fixing hole is compressed to the outer surface of the shank unit to be solidity clamped.

A maximum clamping force may be improved according to an interference size between the exterior diameter (OD) of the shape memory alloy ring 120 and the interior diameter of the ring fixing hole 114, the shape of the slot hole 116, and a number of the shape memory alloy rings 120.

Meanwhile, in the unclamping for the replacement of the tool (T), as shown in FIG. 3 (b), by directly or indirectly providing the heat to the shape memory alloy ring 120 by the heating device providing the heat of the higher temperature than room temperature, if the shape memory alloy ring 120 is heated to more than the austenite transformation temperature and converted to the high temperature state, the exterior diameter of the shape memory alloy ring 120 is expanded and deformed to the original shape such that the interior diameter of the tool fixing hole 112 is expanded and deformed in the radius direction by the restoring force of the shape memory alloy ring 120 along with the ring fixing hole 114 of the tool mounting unit 110 to be unclamped, and then the tool (T) that is inserted into the expanded tool fixing hole 112 may be removed or replacement work for mounting a new tool may be performed.

Also, the shape memory alloy ring 120 has temperature characteristics such that the austenite transformation start temperature point is higher than the heating temperature of the tool holder that may exist during mechanical processing such that the clamping force is not decreased during mechanical processing, and the austenite transformation finish temperature point is considerably higher than the heating temperature of the tool holder that may exist during mechanical processing, however the temperature to be heated to may be achieved by a small heating device such that the tool unclamping may be easily realized through a simple device.

As described above, the shape memory alloy ring 120 inserted inside the ring fixing hole 114 of the tool mounting unit 110 as a temperature change device for the clamping or unclamping operation of the tool (T) may be easily realized if a small heater or a cooling spray is used.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A tool holder for fixing a tool, comprising:
    a tool mounting unit comprising a body having an inner hole in which a shank unit of the tool is inserted, a tool fixing hole in which the shank unit is fixed the inner hole, and a ring fixing hole having an interior diameter that is larger than an interior diameter of the tool fixing hole and arranged in a concentric axis with the tool fixing hole; and
    at least one shape memory alloy ring installed in the ring fixing hole and having a center hole through which in the shank unit of the tool passes, wherein the center hole has a larger diameter than an exterior diameter of the shank unit of the tool to prevent interference with the tool during clamping and unclamping the tool, wherein the shape memory alloy ring is configured to be radially expanded to make the interior diameter of the tool fixing hole larger than the exterior diameter of the shank unit of the tool when the shape memory alloy ring is heated, and the shape memory ally ring is configured to be radially reduced to make the interior diameter of the tool fixing hole smaller than the exterior diameter of the shank unit of the tool when the shape memory alloy ring is cooled, thereby allowing the shank unit of the tool to be clamped in the tool fixing hole,
    wherein the at least one shape memory alloy ring is fixed in the ring fixing hole in an interference fit manner not to be separated from the tool mounting unit, the external circumferential surface of the shape memory alloy ring closely contacts the interior circumference of the ring fixing hole,
    wherein the body of the tool mounting unit has at least one slit hole formed on an outer peripheral surface of the body,
    wherein the at least one slit hole is extended along the concentric axis and entire length of the at least one slit hole is disposed inside the outer peripheral surface of the body, thereby the at least one slit hole being enclosed by the outer peripheral surface of the body and
    wherein the at least one slit hole is connected to the inner hole to facilitate elastic deformation in the radial direction of the body by generating the diameter deformation of the shape memory alloy ring.

2. A tool holder for fixing a tool according to claim 1, wherein
    the at least one slit hole is formed as a plurality of slit holes, and the plurality of slit holes are formed to be spaced at equal intervals in the circumferential direction of the body so as to minimize variation generation by a mass imbalance and centrifugal force.

3. A tool holder for fixing a tool according to claim 1, wherein
    the at least one shape memory alloy ring comprises a first shape memory alloy ring and a second shape memory alloy ring, the first shape memory alloy ring is disposed on one side of the tool fixing hole in the axial direction of the tool fixing hole, and the second shape memory alloy ring is disposed on the other side of the tool fixing hole in the axial direction of the tool fixing hole.

4. A tool holder for fixing a tool according to claim 1, wherein
    the tool mounting unit comprises a deviation preventing groove into which the shape memory alloy ring is inserted and hooked at the inner surface of the ring fixing hole.

5. A tool holder for fixing a tool according to claim 1, wherein
    the interior diameter of the tool fixing hole is expanded so as to be larger than the exterior diameter of the shank unit of the tool when the shape memory alloy ring is heated to more than an austenite transformation temperature, and the interior diameter of the tool fixing hole is reduced so as to be smaller than the exterior diameter of the shank unit of the tool when the shape memory alloy ring is cooled to less than a martensite transformation temperature.

* * * * *